Oct. 21, 1952     H. TOMKINS     2,614,834
SPRING LINK COUPLING FOR DOG LEADS, BABY HARNESS OR THE LIKE
Filed Oct. 26, 1950
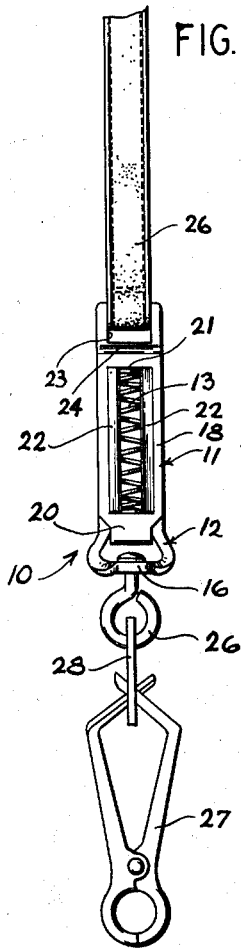
FIG. 1.
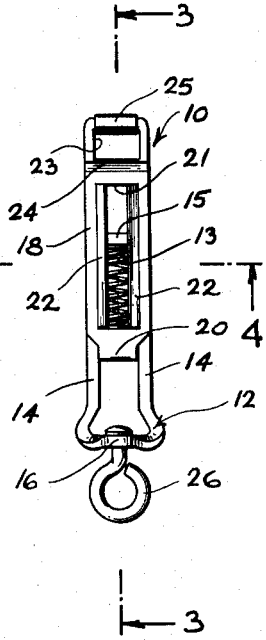
FIG. 2.
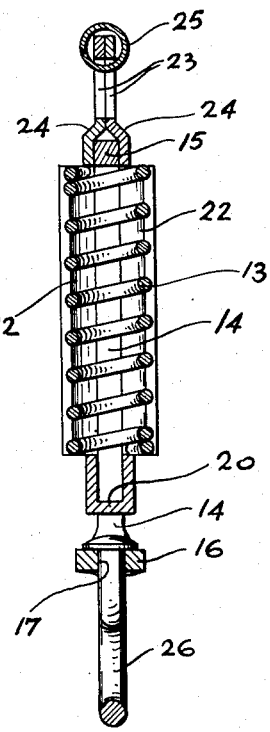
FIG. 3.
FIG. 4.
FIG. 5.    FIG. 6.
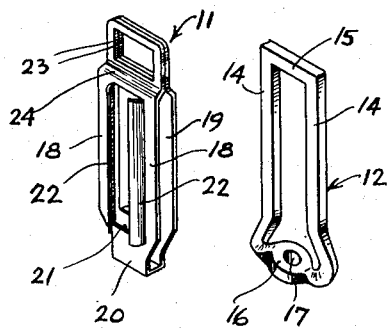
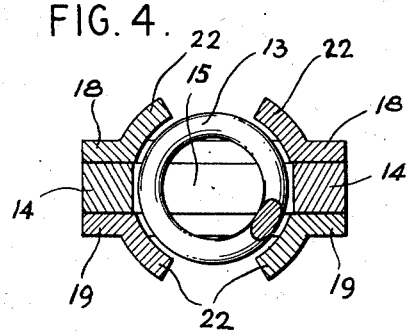
INVENTOR
HAROLD TOMKINS
BY *Mock & Blum*
ATTORNEYS

UNITED STATES PATENT OFFICE 2,614,834

SPRING LINK COUPLING FOR DOG LEADS, BABY HARNESS OR THE LIKE

Harold Tomkins, Walsall, England, assignor to Reliance Pet Supply Inc., New York, N. Y., a corporation of New York Application October 26, 1950, Serial No. 192,175
In Great Britain November 17, 1949

3 Claims. (Cl. 267—71)

This invention relates to improvements in spring link couplings for use in connection with dog leads or leashes, baby harness, and the like.

It is known to interpose between the catch for attachment to the dog collar or harness and the leather strap or chain forming the main portion of the lead or leash, a spring link coupling which will act in the nature of a shock absorber in the event of the dog or child imparting a sudden jerk against the action of the lead. The object of the present invention is to provide a spring link coupling of improved construction.

Another object of the invention is the provision of a spring link coupling composed essentially of two parts both of which may be stamped or pressed from flat metal sheets or sections, together with an ordinary coil spring, so that the coupling is made of a few parts which are easily assembled, affording ease and economy of manufacture.

Still another object of the invention is to provide a spring link coupling of the character described which is sturdy, neat in appearance, and efficient in operation.

Other objects and advantages of the invention will be readily apparent in the course of the following specification and claims when taken in connection with the accompanying drawings, in which:

Fig. 1 is a front elevational view of the spring link coupling of the invention in its normal retracted position, showing one end of said coupling attached to a strap or leash, and the other end of the coupling attached to a clamp which is adapted to be connected to a dog collar, or the like;

Fig. 2 is a front elevational view of the spring link coupling alone, showing said coupling in its extended position;

Fig. 3 is a vertical section as taken along line 3—3 of Fig. 2, but showing the spring link coupling in its retracted position of Fig 1;

Fig. 4 is a horizontal section along line 4—4 of Fig. 2;

Fig. 5 is a perspective view of the body member or housing of the coupling; and

Fig. 6 is a perspective view of the slide member of the coupling.

Referring in detail to the drawings, the spring link coupling 10 generally comprises a body member or housing 11, a slide member 12, and a coiled compression spring 13.

The slide member 12 is formed, preferably by stamping or pressing, as a substantially rectangular, open framework having spaced longitudinal and parallel side arms 14 and a top transverse arm 15. The longitudinal side arms integral with an enlarged boss 16 which extends 14 of said slide member 12 are bowed outwardly at their bottom ends, as shown in Fig. 6 and are across the bottom of slide member 12. After the initial formation of said slide member 12, the boss 16 is turned by a twisting operation through an angle of 90°, so that its plane is perpendicular to the longitudinal axis of slide member 12, as shown in Fig. 6. The boss 16 contains a central hole or bore 17.

The body member or housing 11 is formed of a single blank or length of sheet metal which is bent or doubled over into a substantial U-shape, as shown in Fig. 5, with spaced parallel, longitudinal walls 18 and 19. In the initial formation of the body member 11, the length of sheet metal is stamped or pressed into a flat, elongated, rectangular strip having a central portion of reduced width which forms the neck 20 of body member 11. The said flat strip has an elongated longitudinal slot 21 on each side of, and equidistant from said neck portion 20. The slots 21 are formed in the initial stamping or pressing of the flat metal strip, the cut-out portions of said slots 21 being bent outwardly to form integral flanges 22 along the longitudinal edges of the slots 21. These flanges 22 are preferably arcuate in shape, and are inclined towards one another as shown in Figs. 4 and 5. A substantially square aperture 23 is located adjacent each free end of the flat strip.

The width of the neck portion 20 of the flat metal strip is approximately equal to the distance between the spaced longitudinal side arms 14 of slide member 12. In assembling the spring link coupling 10, the slide member 12 is mounted upon the neck portion 20 of the stamped or pressed metal strip, and said strip is bent or folded upon itself at said neck portion 20, so that its two halves form the spaced parallel walls 18 and 19 of the body member 11. The longitudinal slots 21, in this assembled position of walls 18 and 19, are alined and in registry.

The coiled compression spring 13 is interposed between the spaced longitudinal walls 18 and 19 of the body member 11, said spring 13 also extending through the slide member 12 between the longitudinal side arms 14 thereof. As is clearly shown in Fig. 3, the top and bottom ends of spring 13 are confined by the respective top and bottom edges of the alined longitudinal slots 21 of body member 11. A part of the periphery of the spring 13 projects through each of the alined longitudinal slots 21, as shown in Fig. 4, and bears against, or is slightly spaced from, the inner faces of the respective inclined flanges 22. The flanges 22 thus serve as stop means to limit lateral movement of spring 13, as well as accurate guide means for the longitudinal movement of spring 13 relative to body member 11.

The longitudinal walls 18 and 19 of the body member 11 are bent inwardly immediately above the respective longitudinal slots 21, as indicated at 24, to bring the free ends of the U-shaped body member 11 together into alined flush abutment, with the square apertures 23 in registry. The extreme ends of the body member 11 are encased by a split cylindrical sleeve 25 which serves to hold the longitudinal walls 18 and 19 of body member 11 in parallel disposition, and also serves as a roller around which the end of a leather strap 26, or the like, may be looped.

It is to be noted that in the normal assembled position of the spring link coupling 10, the spring 13 is expanded between the upper and lower edges of the alined longitudinal slots 21, the top of said spring 13 biasing the top transverse arm 15 of the slide member 12 against the inner faces of the inwardly bent portions 24 of the body member walls 18 and 19, as shown in Fig. 3. The slide member 12 is thus yieldably held in its normal retracted position in which the enlarged boss 16 is proximate to the neck 20 of body member 11.

When the boss 16 of slide member 12 is moved downwardly or away from the body member 11, as shown in Fig. 2, the spring 13 is compressed between the top transverse arm 15 of slide member 12 and the bottom edges of the longitudinal slots 21 of body member 11. When the downward or outward pressure on slide member 12 is released, the tension of the compressed spring 13 returns the slide member 12 to its normal retracted position of Fig. 1.

The hole or bore 17 in the enlarged boss 16 is adapted to receive the usual swivel hook or ring 26. The usual clamp or catch 27 is coupled to the hook or ring 26, as by a link 28. The clamp or catch 27 is adapted to be attached to a dog collar or the like in the well-known manner. Should the dog suddenly pull sharply against the lead or leash, or should it become necessary for the owner to tug sharply on the strap 26, the spring link coupling 10 acts as a shock absorber which prevents injury to the dog.

The periphery of the coiled compression spring 13 preferably does not protrude beyond the inclined flanges 22, and the widths of the body member walls 18 and 19 are preferably equal to the width of slide member 12, with the result that a very neat and smoothly-operating spring link coupling 10 is achieved.

The spring link coupling 10 has been described herein, and is defined in the claims as being in the upright or vertical position shown in the drawings, solely for convenience, it being understood that said coupling 10 may be used horizontally, inclined, or in any other position.

While a preferred embodiment of the invention has been shown and described herein, it is obvious that numerous additions, changes, and omissions may be made in the invention without departing from the spirit and scope thereof.

What is claimed is:

1. A spring link coupling comprising a substantially rectangular, flat, open-frame slide member having a central opening, a flat, hollow, substantially rectangular body member, and a coiled compression spring, said body member being formed of a single flat strip of sheet metal of elongated rectangular shape having a pair of windows stamped therein equidistant from the central lateral axis of said strip, said strip being bent upon itself at a fold along its central lateral axis to provide a pair of spaced, parallel and alined front and rear longitudinal walls in which said windows are in registry, open sides, and a closed bottom neck portion defined by said fold, the top portions of said longitudinal walls being bent inwardly in flush abutment with each other a closed bottom neck portion defined by said fold, the top portions of said longitudinal walls being spaced apart a sufficient distance to form a central recess in said body member of sufficient width to house said slide member, said recess extending continuously from the top wall to the bottom neck portion of said body member, said neck portion being of reduced width relative to the longitudinal walls, said slide member being mounted for longitudinal sliding movement within said body member with the bottom end of said slide member located exteriorly of said body member, said spring being also mounted in said body member between the top and bottom edges of the respective windows with a portion of said spring protruding through said windows, said spring extending through the central opening of said slide member and normally urging said slide member to a retracted position within said body member in which the lower end of said slide member is proximate to the neck portion of said body member, said spring being positioned to be compressed by said slide member when the latter is slid away from its retracted position.

2. A spring link coupling comprising a substantially rectangular, flat, open-frame slide member having a central opening, a substantially rectangular body member, and a coiled compression spring, said body member being formed of a single flat strip of sheet metal of elongated rectangular shape having a cut-out mounting opening at each of its ends and equidistant therefrom, and respective pair of stamped-out panels pressed outwardly from said strip to define a pair of apertures equidistant from the central lateral axis of said body member, said strip being bent upon itself at a fold along its central lateral axis to provide a pair of spaced, parallel, and alined planar front and rear walls defining a recess therebetween, the apertures and mounting openings of said walls being in respective registry, said body member having a closed bottom neck portion defined by said fold, said neck portion being of reduced width relative to the width of said longitudinal walls, the top portions of said longitudinal walls being bent inwardly in flush abutment with each other in the vicinity of said registering mounting openings and being secured together to form a closed top wall of said body member, said slide member being mounted for longitudinal sliding movement within the recess of said body member with the neck portion located within the central opening of said slide member and serving as a guide for the longitudinal movement of said slide member, the bottom end of said slide member being located exteriorly of said body member, the stamped out panels of said longitudinal walls being outwardly bent in an arcuate shape and cooperating with each other and with said apertures to define an interrupted, substantially cylindrical housing, said spring being seated in said housing between the top and bottom edges of said apertures, said spring being also located within the central recess of said slide member to a retracted position within said body member in which the lower end of said slide member is proximate to the neck portion of said body member.

3. A spring link coupling for attaching a leash to a dog collar or the like, said coupling comprising a substantially rectangular, flat, open-frame slide member having a central opening and a bottom end carrying means for releasable attachment thereof to said dog collar, a substantially rectangular body member, and a coiled compression spring, said body member being formed of a single flat strip of sheet metal of elongated rectangular shape having a cut-out opening at each of its ends and equidistant therefrom, and a pair of stamped-out apertures equidistant from the central lateral axis of said body member, each of said apertures being bordered by a pair of longitudinally-extending arcuate pressed-out flanges, said strip being bent upon itself at a fold along its central lateral axis to provide a pair of spaced, parallel and alined front and rear longitudinal walls defining a recess therebetween, the openings and apertures in said walls being in respective registry, open sides, and a closed bottom neck portion defined by said fold and being of reduced width relative to the width of said longitudinal walls, the top portions of said longitudinal walls being bent inwardly in flush abutment with each other in the vicinity of said registering openings, said body portion having a cylindrical hollow roller engirdling the top edges of said longitudinal walls above said openings, to secure the top portions of said longitudinal walls together and also to provide means for pivotable attachment of said leash, said slide member being mounted for longitudinal sliding movement within the recess of said body member with the neck portion located within the central opening of said slide member, and the bottom end of said slide member located exteriorly of said body member, the arcuate flanges of said apertures projecting outside the body portion and cooperating with said apertures to define an interrupted, substantially cylindrical housing, said spring being located in said housing between the top and bottom edges of said apertures and abutting the top of said slide member to urge said slide member to a retracted position within said body member in which position the lower end of said slide member is proximate to the neck portion of said body member.

HAROLD TOMKINS.

REFERENCES CITED

The following references are of record in the file of this patent:

UNITED STATES PATENTS

| Number | Name | Date |
|---|---|---|
| 1,212,765 | Griffeth | Jan. 16, 1917 |
| 1,364,427 | Corey | Jan. 4, 1921 |
| 1,449,346 | Pagel | Mar. 20, 1923 |